US012759313B2

(12) United States Patent
Huang et al.

(10) Patent No.: US 12,759,313 B2
(45) Date of Patent: Oct. 13, 2026

(54) THERMAL PRINTER AND METHOD OF IMPROVING PRINT QUALITY

(71) Applicant: ZEBRA TECHNOLOGIES CORPORATION, Lincolnshire, IL (US)

(72) Inventors: Jinqiang Huang, Guangzhou (CN); Changyan Huang, Guangzhou (CN); Hongqiang Liu, Guangzhou (CN); Jia Ying, Guangzhou (CN)

(73) Assignee: Zebra Technologies Corporation, Lincolnshire, IL (US)

( * ) Notice: Subject to any disclaimer, the term of this patent is extended or adjusted under 35 U.S.C. 154(b) by 167 days.

(21) Appl. No.: 18/912,527

(22) Filed: Oct. 10, 2024

(65) Prior Publication Data

US 2026/0103008 A1 Apr. 16, 2026

(51) Int. Cl.
*B41J 2/365* (2006.01)
*B41J 11/04* (2006.01)

(52) U.S. Cl.
CPC ............... *B41J 2/365* (2013.01); *B41J 11/04* (2013.01)

(58) Field of Classification Search
CPC ..... B41J 2/365; B41J 2/36; B41J 11/04; B41J 2/355; B41J 2/362; B41J 2/37
See application file for complete search history.

(56) References Cited

U.S. PATENT DOCUMENTS

| | | | | |
|---|---|---|---|---|
| 11,440,315 | B2 * | 9/2022 | Mawatari | B41J 2/04595 |
| 11,602,933 | B2 * | 3/2023 | Wong | B41J 2/04541 |
| 2012/0218333 | A1 * | 8/2012 | Nishikawa | B41J 2/04581 347/10 |

* cited by examiner

*Primary Examiner* — Kristal Feggins

(57) ABSTRACT

Methods of improving print quality are disclosed herein. An example method of improving print quality may be embodied by a method of temperature compensation for a thermal printhead having a plurality of heating elements, including identifying, for the heating element corresponding to the column of the pixel, when a number of pulses delivered to the heating element in a predetermined window prior to a line of the pixel is outside of a defined range and responsive to determining that the number of pulses is outside the defined range, and prior to printing the pixel, adjusting the pulse sequence to be delivered to the heating element corresponding to the column of the pixel to print the pixel at a line of the pixel following the predetermined window.

21 Claims, 11 Drawing Sheets

THERMAL PRINTER AND METHOD OF IMPROVING PRINT QUALITY

BACKGROUND

Thermal printers employ heating elements to print pixels on printable media with thermochromic properties. In order to produce a desired pattern, such as text or images, on the media the heating elements are selectively controlled to heat the media to produce each pixel to be printed on the media. Generally thermal print heads have a line of heating elements that together print successive lines of pixels on the media by selectively heating desired pixels on a particular line, with each heating element adapted to successively heat the selected pixels in a single column.

SUMMARY

In an embodiment, the technology of the present disclosure is provided by a method of temperature compensation for a thermal printhead having a plurality of heating elements, In a variation of this embodiment, the thermal printhead is configured to print pixels of a print pattern, the print pattern including a plurality of columns and a plurality of lines, each heating element corresponding to one column of the print pattern, where for each pixel to be printed, the thermal printhead delivers a pulse sequence of at least one pulse of electrical current to a heating element corresponding to a column of the pixel, causing the heating element to print the pixel, the method comprising identifying, prior to printing the pixel, and for the heating element corresponding to the column of the pixel, when a number of pulses delivered to the heating element in a predetermined window prior to a line of the pixel is outside of a defined range, adjusting, responsive to determining that the number of pulses is outside the defined range, and prior to printing the pixel, the pulse sequence to be delivered to the heating element corresponding to the column of the pixel to print the pixel at a line of the pixel following the predetermined window.

In a variation of this embodiment, the pulse sequence is adjusted by decreasing a pulse width of a pulse in the pulse sequence responsive to the number of pulses in the window for the heating element exceeding an upper threshold of the defined range.

In a variation of this embodiment, the pulse sequence is adjusted by increasing a pulse width of a pulse in the pulse sequence responsive to the number of pulses in the window for the heating element being below a lower threshold of the defined range.

In a variation of this embodiment, the pulse sequence includes at least two pulses, and the pulse sequence is adjusted by omitting at least one pulse from the pulse sequence responsive to the number of pulses in the window for the heating element exceeding an upper threshold of the defined range.

In a variation of this embodiment, the pulse sequence is adjusted by adding at least one pulse to the pulse sequence responsive to the number of pulses in the window for the heating element being below a lower threshold of the defined range.

In a variation of this embodiment, a size of the predetermined window is determined based on a number of lines in the print pattern preceding the line of the pixel.

In a variation of this embodiment, a size of the predetermined window is determined based on a period of time prior to printing the pixel.

In a variation of this embodiment, the method further includes receiving sensor data from a sensor measuring a condition of a printed media element on which the pixel is printed, and calibrating the defined range based on the sensor data.

In a variation of this embodiment, the sensor is a temperature sensor, and an upper threshold of the defined range is decreased when the sensor data indicates that the temperature of the media element exceeds a predetermined high temperature threshold.

In a variation of this embodiment, the sensor is a temperature sensor, and a lower threshold of the defined range is increased when the sensor data indicates that the temperature of the media element does not meet a predetermined low temperature threshold.

In a variation of this embodiment, the sensor is an optical sensor, and an upper threshold of the defined range is decreased when the sensor data indicates that the media element contains a printed region which is darker than a predetermined optical threshold.

In a variation of this embodiment, the sensor is an optical sensor, and a lower threshold of the defined range is increased when the data received from the optical sensor indicates that the media element contains a printed region which is lighter than a predetermined optical threshold.

In a variation of this embodiment, the window is identified by a counter or a filter operating during a thermal printing process.

In another embodiment, the present technology is provided by a device, including a thermal printhead, including a plurality of heating elements, each configured to print a column of pixels of a print pattern The print pattern includes a plurality of columns and a plurality of lines, each heating element corresponding to one column of the print pattern. For each pixel to be printed, the thermal printhead is configured to deliver a pulse sequence of at least one pulse of electrical current to a heating element corresponding to a column of the pixel, causing the corresponding heating element to print the pixel on a media element. Prior to printing a given pixel, the device is configured to identify, for the heating element corresponding to the column of the given pixel, when a number of pulses delivered to the heating element in a predetermined window prior to the line of the given pixel is outside of a defined range, and adjust the pulse sequence to be delivered to the heating element corresponding to the column of the given pixel to print the given pixel at a line of the given pixel following the predetermined window when the number of pulses delivered to the heating element in the predetermined window is outside of the defined range.

In a variation of this embodiment, the pulse sequence is adjusted by decreasing a pulse width of a pulse in the pulse sequence responsive to the number of pulses in the window for the heating element exceeding an upper threshold of the defined range.

In a variation of this embodiment, the pulse sequence is adjusted by increasing a pulse width of a pulse in the pulse sequence responsive to the number of pulses in the window for the heating element being below a lower threshold of the defined range.

In a variation of this embodiment, the pulse sequence includes at least two pulses, and the pulse sequence is adjusted by omitting at least one pulse from the pulse sequence responsive to the number of pulses in the window for the heating element exceeding an upper threshold of the defined range.

In a variation of this embodiment, the pulse sequence is adjusted by adding one or more pulses to the pulse sequence responsive to the number of pulses in the window for the heating element being below a lower threshold of the defined range.

In a variation of this embodiment, the processing platform is configured to analyze the print pattern to identify when the number of pulses delivered to the heating element in the predetermined window prior to the line of the given pixel is outside of the defined range, adjust the pulse sequence, transmit data corresponding to the pulse sequence to a controller in communication with the thermal printhead, the controller configured to deliver the pulse sequence to the corresponding heating element according to the data transmitted from the processing platform.

In a variation of this embodiment, the processing platform is configured to analyze the print pattern to identify when the number of pulses delivered to the heating element in the predetermined window prior to the line of the given pixel is outside of the defined range, adjust the pulse sequence, and deliver the pulse sequence to the corresponding heating element.

In a variation of this embodiment, the device further includes a platen roller, and the platen roller and the thermal printhead are controlled by the processing platform.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed present technology and explain various principles and advantages of those embodiments.

Figure 1:
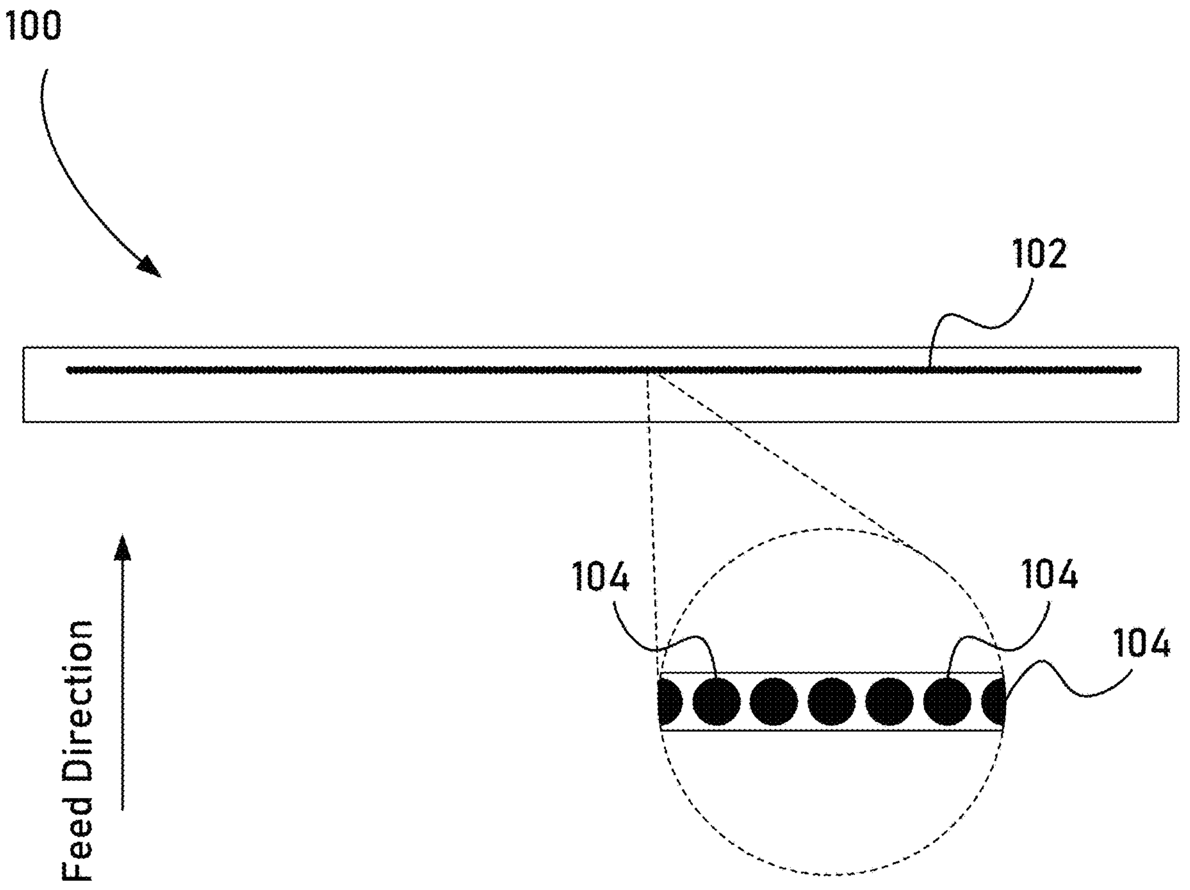
FIG. 1 illustrates a simplified representation of a thermal printhead.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present technology. Other common elements of print heads and printers which perform in a conventional manner may in some cases be omitted from the figures, but an ordinary artisan will recognize they can be included.

The apparatus and method components have been represented where appropriate by conventional symbols in the drawings, showing only those specific details that are pertinent to understanding the embodiments of the present technology so as not to obscure the disclosure with details that will be readily apparent to those of ordinary skill in the art having the benefit of the description herein.

DETAILED DESCRIPTION

A common issue with thermal printers is the production inconsistent darkness on printed products, especially those having large areas of saturated black or gray. When printing large areas of black or gray, some thermal printers may experience overheating, which in some cases may result in oversaturation or over-darkening of the black or gray printed areas, or even burning of the printable media. The present disclosure describes systems or methods that may be useful in correcting this problem by adjusting the manner in which heat is delivered to a printed media based on the amount of printing that has recently been done in the same column, possibly in conjunction with temperature measurements. So, if a lot of pixels in the same column have recently been printed, and/or the temperature is high, the number or size of pulses used to drive the heating element for that column may be reduced, still allowing a proper printing of dark pixels, but reducing overheating and/or oversaturation or burning.

While temperature sensors might be used to help improve performance and correct this problem, it is impractical to provide such sensors close enough to the printing elements to be able to determine the problems discussed above with respect to individual columns or groups of columns. Generally, a thermal printer temperature feedback sensor, if one is present, is not located directly at the printing elements, e.g., a sensor may be provided downstream of the heating element. Thus, without greatly increasing cost and complexity, adding sufficient sensors to control individual heating elements is not practical in many typical direct thermal printers, which are often relatively low cost, small, and possibly even portable, devices.

FIG. 1 illustrates a simplified diagram of a thermal printhead 100, which may be representative of conventional thermal printheads. Generally speaking, the thermal printhead 100 includes a burn line 102, including a plurality of heating elements 104. Each heating element 104 is configured to receive pulses of electrical current, which causes the heating element to increase in temperature, which allows the heating element to print a pixel on a thermal printable medium. When the thermal printable medium is passed beneath the thermal printhead (e.g., in the feed direction, perpendicular to the burn line), each heating element is configured to print one column of pixels on the thermal printable medium over the course of a printing process, and the heating elements are configured to collectively print one line of pixels at a given time in the printing process. For each pixel to be printed, a respective heating element 104 receives a pulse sequence of at least one pulse of electrical current. Most of the discussion in the present disclosure is written in terms of black pixels being printed on a white or light background, but it will be appreciated that the disclosed invention is applicable to other variations using appropriate media, e.g., color printing, gray scale printing, multi-color printing, or the like.

Figure 2A:
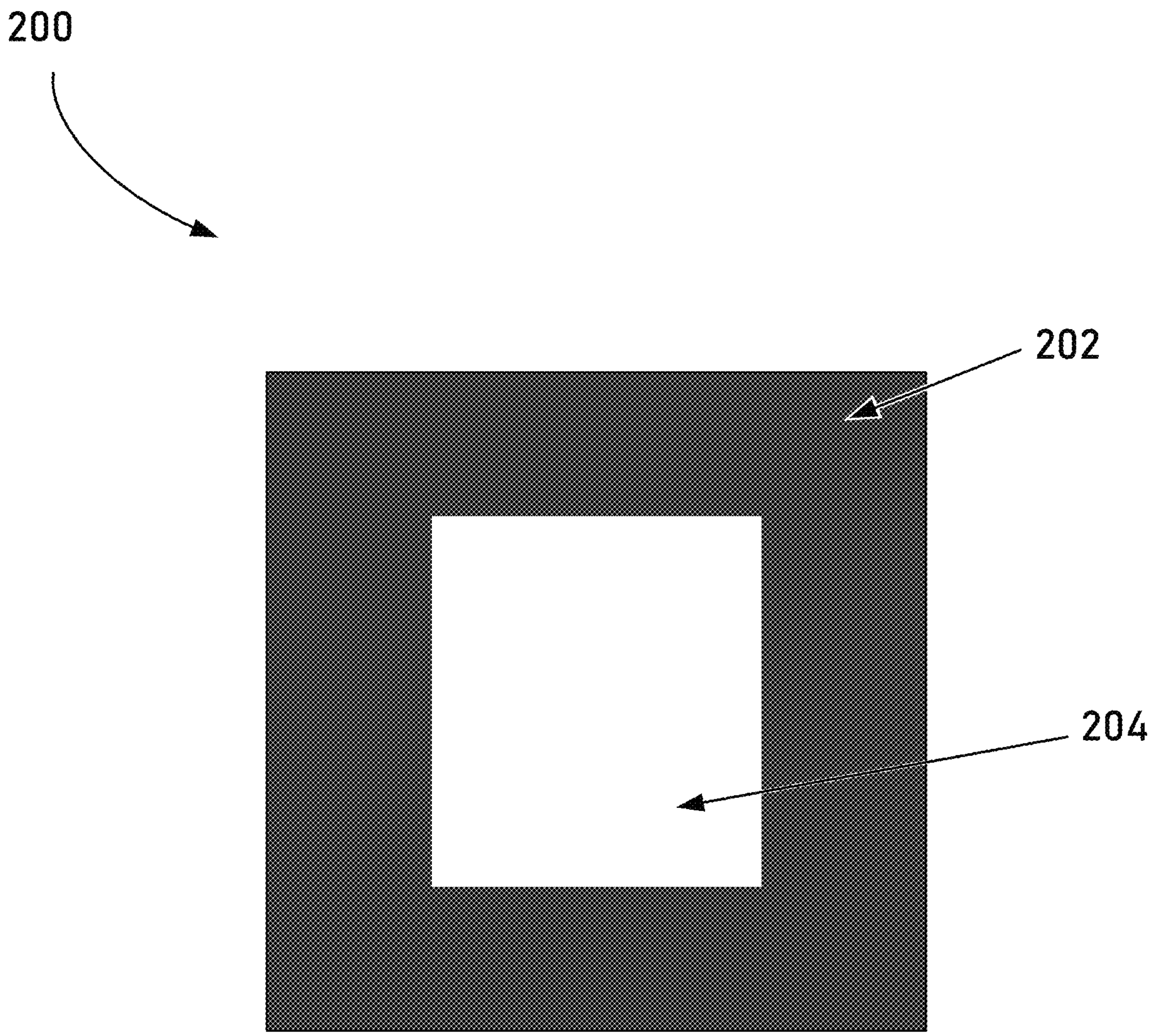
FIG. 2A illustrates a print pattern.

FIG. 2A illustrates a print pattern 200, including a dark border 202 surrounding a white block 204 (non-printed area).

Figure 2B:
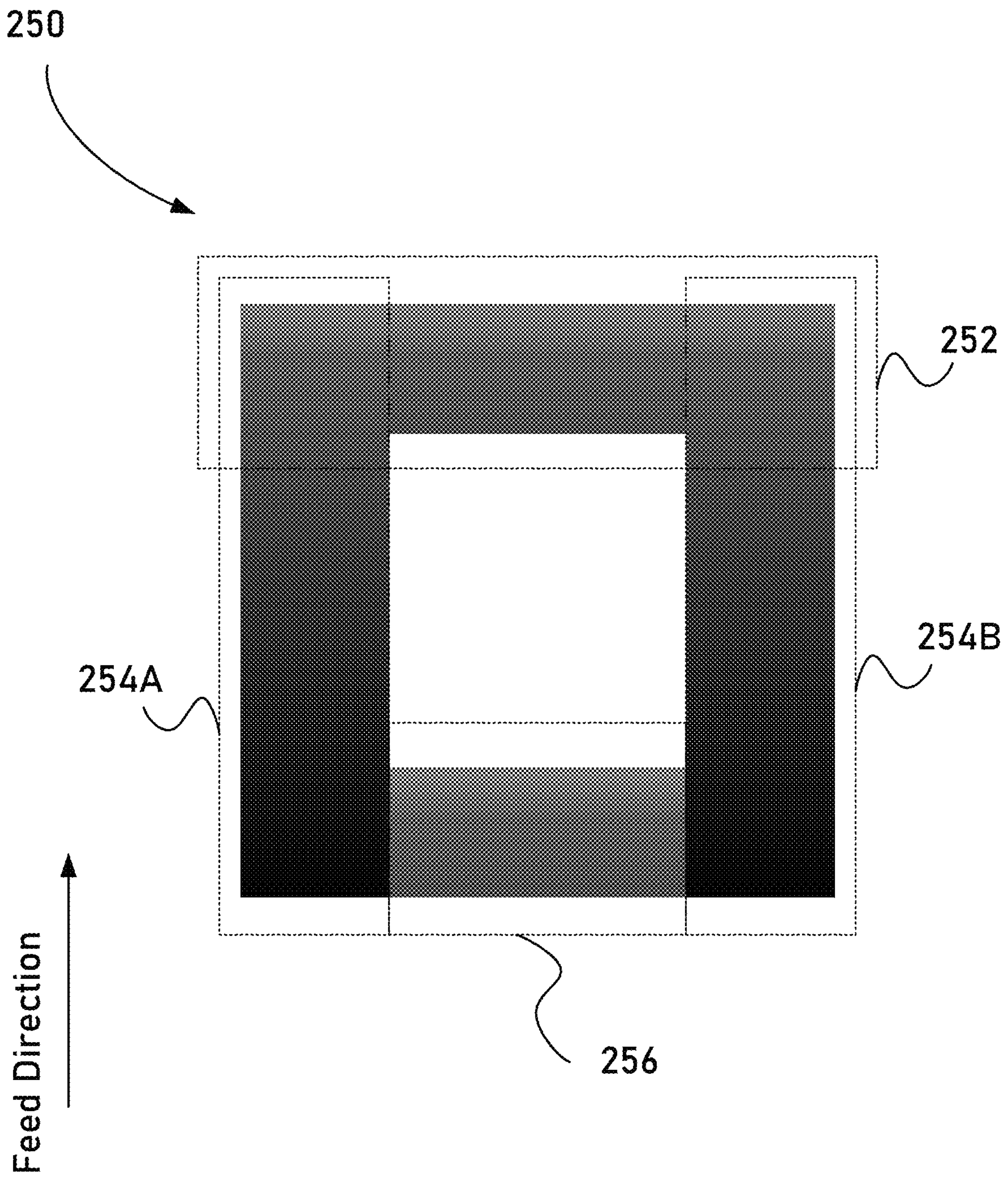
FIG. 2B illustrates an example printout of the print pattern of FIG. 2A.

FIG. 2B illustrates an example printout 250 of the print pattern 200, as may be printed on a thermal printable medium by the thermal printhead 100. The printout 250 is representative of potential issues arising from uneven heating (e.g., overheating and underheating) of a thermal printhead 100 during a thermal printing process. The printout 250 is divided into several referential regions, in which several different failure modes are viewable.

In region 252, the dark printed area contains a light-to-dark gradient, which results from initial underheating of the thermal printhead, where printing of the first several lines of pixels may have occurred prior to the heating elements 104 heating to an appropriate temperature for printing. As a result, the first several lines of pixels are not as dark as some subsequent lines of pixels, resulting in the gradient.

The gradient continues development down the sides of the border portions in regions 254A and 254B, where the final lines in the printout 250 are darker than intended or the rest of print pattern. This over darkening may result from heating elements of the thermal printhead progressively overheating as successive lines are printed. When many successive pixels in a given column are printed pixels, the heating element corresponding to the given column receives a large total input of electrical current input over the course of the printing process. If insufficient time is allowed for cooldown between pulses (e.g., by having sufficient white or unprinted pixels in the column, or undesirably, by slowing the printing process), some heating elements 104 may experience overheating, which may result in some printed pixels being too large, burning of the thermal printable medium, non-printed (white) pixels being printed inadvertently, and general over darkening of some printed portions of the printout 250.

Region 256 exhibits a similar gradient as region 252. The large amount of preceding white space (corresponding to the white block 204 of the print pattern) provides time for the heating elements 104 of those respective columns to cool, as no pulses of electrical current are provided to heat the heating elements 104 during the printing of the white block 204. When the lines containing pixels to be printed reach the burn line 102, the heating elements of the columns corresponding to the region 256 begin to receive pulses of electrical current, and similar to region 252, the heating elements 104 may not receive enough current to come to printing temperature for the first several lines of region 256, resulting in a similar light-to-dark gradient as is present in region 252.

The following discussion relates to various embodiments of methods of improving print quality and thermal printing-related apparatuses in which print quality is improved. Generally speaking, the method 300 may be implemented in order to reduce or eliminate certain features appearing on printed media, such as those which deviate from a corresponding intended print pattern. Such features are discussed above with respect to FIG. 2B, namely, unwanted color/darkness gradients and burns on the printed media. The method 300 involves the identification of pixels, or certain regions of pixels where the preceding pixels are printed pixels (e.g., dark regions). The heating elements of the thermal printhead corresponding to the pixels of the dark regions receive substantial input of current when printing the pixels of the dark regions, which in some cases causes overheating of the heating elements, resulting in over-darkening of the printed media. The method 300 may be employed to identify such pixels and dark regions where over-darkening is prone to occur during a printing process, and subsequently adjust (e.g., reduce) the current input to the corresponding heating elements during the printing process to reduce or prevent overheating. By reducing the current input to the heating elements, less heat is generated by the heating elements, facilitating a mode of downward temperature compensation.

The method 300 may also be applied to correct under-darkening in thermally printed media. Just as dark regions may be identified, printed regions proximate to non-printed regions (e.g., dark regions abutting white regions), may develop a light to dark gradient (see FIG. 2B) as printing occurs while heating elements come to printing temperature. Where applicable, the method 300 may be employed to identify such regions and increase the current input to the corresponding heating elements, decreasing an amount of time for the heating elements to come to printing temperature. By increasing the current input to the heating elements, more heat is generated by the heating elements, facilitating a mode of upward temperature compensation.

Figure 3:
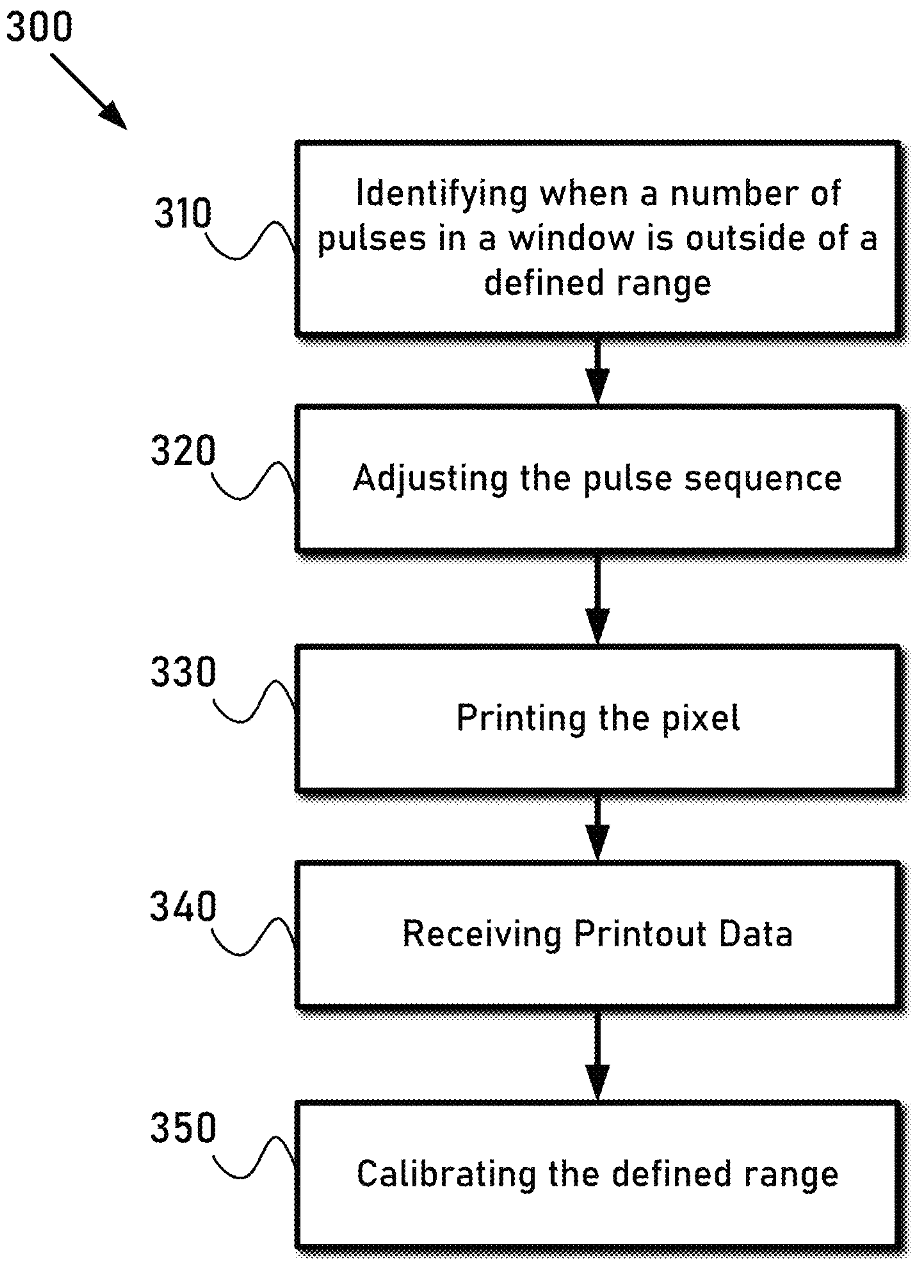
FIG. 3 illustrates a flowchart describing a method of improving print quality, according to embodiments of the present disclosure.
Figure 4:
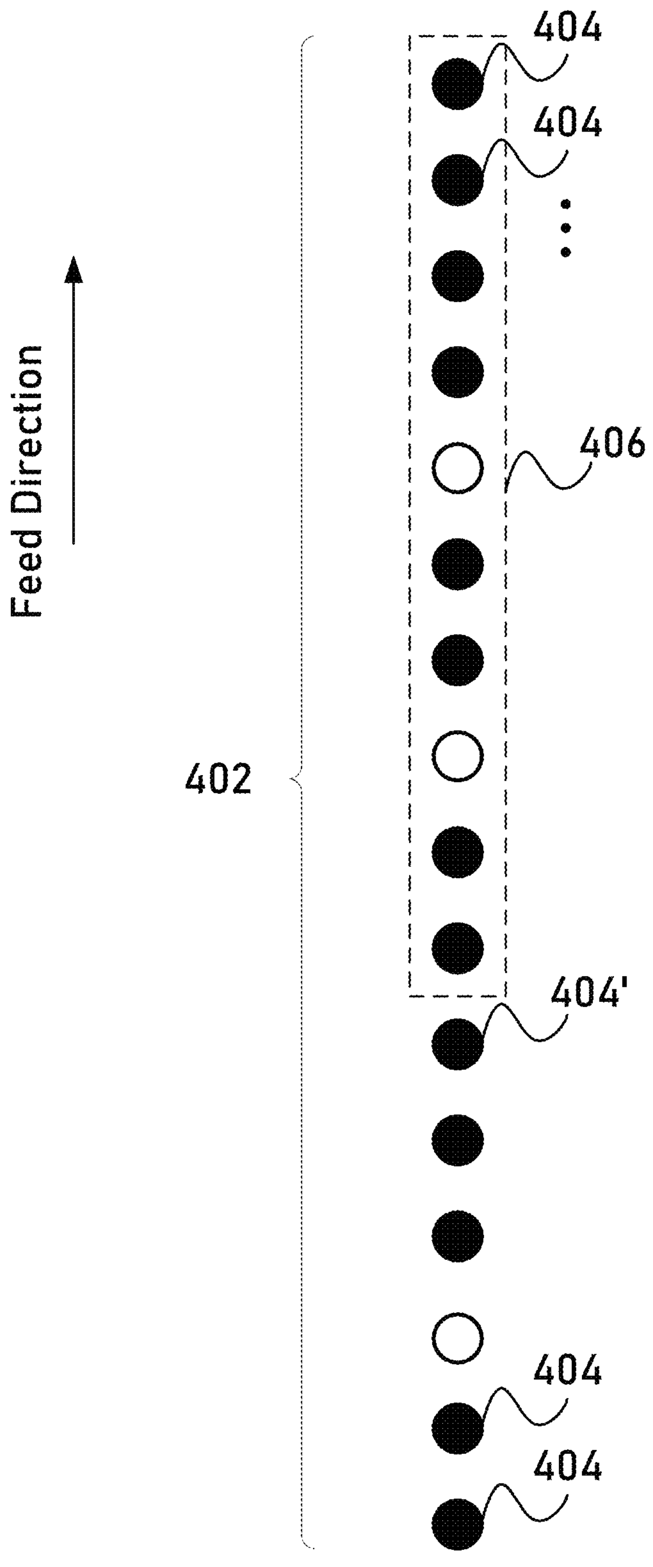
FIG. 4 illustrates an example window of pixels, according to embodiments of the present disclosure.

FIG. 3 illustrates flowchart describing steps of the method 300 of temperature compensation, which may be employed to improve print quality of thermally printed media, according to embodiments of the present disclosure. FIGS. 4-5F illustrate visualizations of certain concepts and features which are conceptualized in the method steps of the method 300, according to embodiments of the present disclosure, and are included to improve understanding. The method 300 is directed towards improving the print quality of thermally printed media (e.g., as may be printed using the thermal printhead 100), although other applications of the method 300 are contemplated. Prior to beginning the method 300, a print pattern is provided, e.g., such as print pattern 200. The print pattern includes rows and columns of pixels to be printed. When received by the thermal printer, the pixels may be represented digitally, as one of various conventional file types. It will be appreciated that the print pattern may be received all at once by the printer prior to printing a media or may be received in successive blocks.

At block 310, a window of pixels in successive lines in the print pattern is identified where a number of pulses supplied previously or to be supplied to a heating element of the thermal printhead to print the pixels in the column corresponding to the heating element within the window is outside of a defined range. FIG. 4 illustrates an example column 402 of pixels 404 in a print pattern, where a window 406 is defined relative to a pixel of interest 404'. The pixel of interest 404' may be any pixel 404 in the print pattern, and each pixel 404 in the print pattern may have a corresponding window 406. The window 406 is of a predetermined size, which may be adjusted or tuned corresponding to the various tendencies of a given thermal printer. The window can include a number of pixels in a feed direction (e.g., a column length) and can include one or more pixels per line in a direction that is perpendicular to the feed direction (e.g., row width). As illustrated, the window 406 contains 10 pixels of 10 lines printed or to be printed in the feed direction (e.g., the column length) and 1 pixel in the direction perpendicular to the feed direction (e.g., the row width). The 10 pixels that form the window 406 can correspond to the 10 pixels printed or to be printed before the pixel of interest 404'. Using this example, the 10 pixels included in the window can change for each successive line printed or to be printed such for each line to the printed the window includes the pixels from the previous or last 10 lines that are printed or that are to be printed. In some examples, the window may be sized corresponding to a period of time, and the number of pixels 404 contained in the window 406 in the feed direction and/or the direction perpendicular to the feed direction can be determined based on the feed rate of the printer, a number of heating elements in the printhead, a segmentation of heating elements in the printhead, a specified or desired granularity of the temperature compensation to be applied, a printhead pressure, and/or based on other considerations. In some examples, the size of the window in the feed direction corresponds to a determinate number of pixels in a column in successive lines.

In various examples, the size of the window may be configured to contain between 1 and 5 pixels, between 5 and 10 pixels, between 10 and 100 pixels, between 100 and 500 pixels, and between 500 and 1000 pixels.

In various examples, the size of the window 406 may correspond to a period of time during a printing process, where the size of the window is selected to encapsulate a duration of between 0.001 and 0.1 seconds, between 0.1 and 1 second, and between 1 and 5 seconds.

The example ranges given for the size of the window are purely exemplary, the method 300 may be performed where the window is any size.

In various examples, the temperature compensation can be performed for one or more windows, e.g., to cover a width of the burn line of the printhead, e.g., based on a quantity and/or density of heating elements the printhead includes. As an example, there can be one window for each possible pixel that can be printed by the heating elements of the printhead (e.g., the row width of each window is 1 and the number of windows is equal to the number of heating elements the printhead includes). In some examples, the windows can overlap each other in the direction perpendicular to the feed direction such that the windows can each include a subset of pixels.

In the context of block 310, various windows (e.g., window 406) across the print pattern are analyzed to identify one or more windows where a number of pulses supplied or to be supplied to a heating element of the thermal printhead to print the pixels within the window is outside of a defined range.

In some examples, the analysis includes counting the number of pixels in a window which are pixels that have been printed or that are to be printed (e.g., black pixels in black on light printing). A thermal printer is configured to deliver a pulse sequence of electrical current to a heating element to print one pixel. Conventionally, the pulse sequence includes one pulse of a given pulse width (a duration of the pulse) to print one pixel, however other pulse sequences, such as those including two or more pulses are contemplated. In such examples, the number of black pixels is directly correlated to a number of pulses that are successively delivered or that are to be successively delivered to a heating element to print the pixels in the window. Thus, the number of pulses may be counted by counting the pixels printed or to be printed in the print pattern. When the number of black pixels in a window is above a certain upper threshold, or below a certain lower threshold (where the thresholds may be calibrated and tuned to the peculiarities of a given printer), the window is identified as being outside of the defined range.

In some examples, the upper threshold may be defined where 75% or more of the pixels in a window are black pixels, where 80% or more of the pixels in a window are black pixels, where 85% of more of the pixels in a window are black pixels, where 90% of more of the pixels in a window are black pixels, where 95% or more of the pixels in a window are black pixels, or where 100% of the pixels in a window are black pixels. As an example, with reference to FIG. 4, the window includes 10 total pixels, 8 of which are black pixels. The percentage of black pixels in the window 406 is 80%. If the upper threshold is 80% or lower, the upper threshold is satisfied, and if the upper threshold is greater than 80%, the upper threshold is not satisfied. It will be appreciated that the upper threshold may depend on the window size.

In some examples the lower threshold may be defined where 25% or less of the pixels in the window are black pixels, where 20% or less of the pixels in the window are black pixels, where 15% or less of the pixels in the window are black pixels, where 10% or less of the pixels in the window are black pixels, where 5% or less of the pixels in the window are black pixels, where 0% of the pixels in the window are black pixels. As an example, if the window includes 10 total pixels and 2 of the pixels are black. The percentage of black pixels in the window 406 is 20%. If the lower threshold is 20% or higher, the lower threshold is satisfied, and if the lower threshold is less than 20%, the lower threshold is not satisfied. It will be appreciated that the threshold may depend on the window size.

A defined range for a window can be, for example, a range that is between the lower and upper thresholds. As an example, if the lower threshold is 20% and the upper threshold is 80%, the defined range is 20-80%. The ranges provided for the upper threshold and the lower threshold are purely exemplary, the method 300 may be performed such that the upper and lower thresholds apply to any proportion of black pixels in the window.

In some examples, the windows are identified prior to pixels being printed on a media article. In this manner, a print design is analyzed by a computing device or logic circuit to identify windows before printing instructions are delivered to the thermal printhead. This may be, e.g., a processor in the printer, or even a dedicated processor in the printhead.

In other examples, the analysis is performed in-step with the printing process. Each heating element (e.g., heating element 104) may include (e.g., or otherwise be connected to) a counter or filter (e.g., a boxcar filter, counter circuit, moving average calculator circuit, and the like), which determines a metric corresponding to the pulses received by the heating element. In such examples, the window is determined on the basis of a period of time, and the window is moving throughout the printing process as media is advanced. The metric corresponding to the number of pulses may be a moving average of number of pulses within a window, total pulse width of the pulses within the window, or a similar metric. The window is identified when the metric corresponding to the number of pulses is above a certain upper threshold, or below a certain lower threshold (where the thresholds may be calibrated and tuned to the peculiarities of a given printer), the window is identified.

Windows may be identified having a quantity of printed pixels being outside of a defined range, windows may be identified as having a quantity of pulses received by the heating element being outside of a defined range, and/or windows may be identified as having a metric corresponding to a number of pulses received by the heating element being out of a defined range, across various embodiments of the present disclosure. When the identified window as being outside of the defined range has a number of pixels, number of pulses, or metric corresponding to a number of pulses, that exceeds the upper threshold of the defined range, the window may be referred to as a "high-density window." When the identified window as being outside of the defined range has a number of pixels, number of pulses, or metric corresponding to a number of pulses, that is below a lower threshold of the defined range, the window may be referred to as a "low-density window".

At block 320 of the method 300, the pulse sequence to be delivered to the heating element is adjusted in response to identifying that the window of pixels is outside of a defined range, according to embodiments of the present disclosure. Responsive to a window being identified as being outside the defined range, the pulse sequence to be delivered to the heating element to print the pixel of interest 404' corresponding to the identified window is adjusted. For example, when the number of black or dark pixels in the window identified as being outside of the defined range is above the predetermined upper threshold (or alternatively, if the number of pulses in the window pulses is above the certain upper threshold), the pulse sequence may be shortened. When the number of pixels in the window identified as being outside of the defined range is below the predetermined lower threshold (or alternatively, the number of pulses in the window is below the certain lower threshold), the pulse sequence may be lengthened. The shortening (or lengthening) of the pulse sequence may be accomplished by decreasing (or increasing) the number of pulses delivered for a particular pixel, or alternative by decreasing (or increasing) the duration of a pulse or pulses delivered for printing the particular pixel.

FIGS. 5A-5F illustrate various example pulse profiles of pulse sequences which may be employed to print a pixel via a heating element. Each pulse sequence is represented on an amperage vs time plot and includes a pulse window 520 indicating to total period of time in which pulses may be supplied to the heating element to print a given pixel. Prior to, and subsequent to each pulse window may be another pulse window corresponding to another pixel. The pulse profiles of the pulse sequences 500A-F include pulses of various lengths, which are named relative to a "standard" pulse. As used herein, the standard pulse is simply an example pulse which has a pulse width that is less than the maximum possible pulse width and greater than the minimum possible pulse width. As such, other pulses may be longer or shorter than the standard pulse, such that the standard pulse serves as a reference towards the middle of the range of possible pulse widths. The temporal length of the standard pulse may vary across embodiments. As used herein, the term "standard pulse" is not intended to limit the scope of the disclosure in any manner and serves exclusively as a referential benchmark for describing the pulse sequences and improving understanding thereof.

Figure 5A:
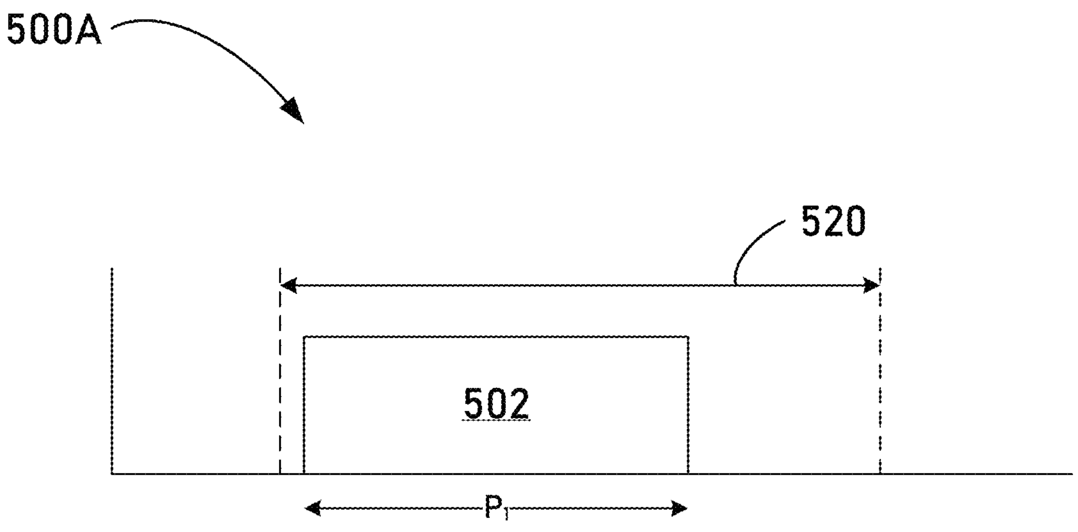
FIGS. 5A-5F illustrate electrical current pulse profiles, according to embodiments of the present disclosure.

FIG. 5A illustrates a first pulse sequence 500A, consisting of one standard pulse 502 of pulse width $P_1$. Thus, the total pulse width of the first pulse sequence 500A is $P_1$. In some examples, the first pulse sequence 500A is a pulse sequence applied by a heating element of a thermal printer to print one pixel. In some examples, the first pulse sequence 500A may be an initial pulse sequence, or an adjusted pulse sequence.

Figure 5B:
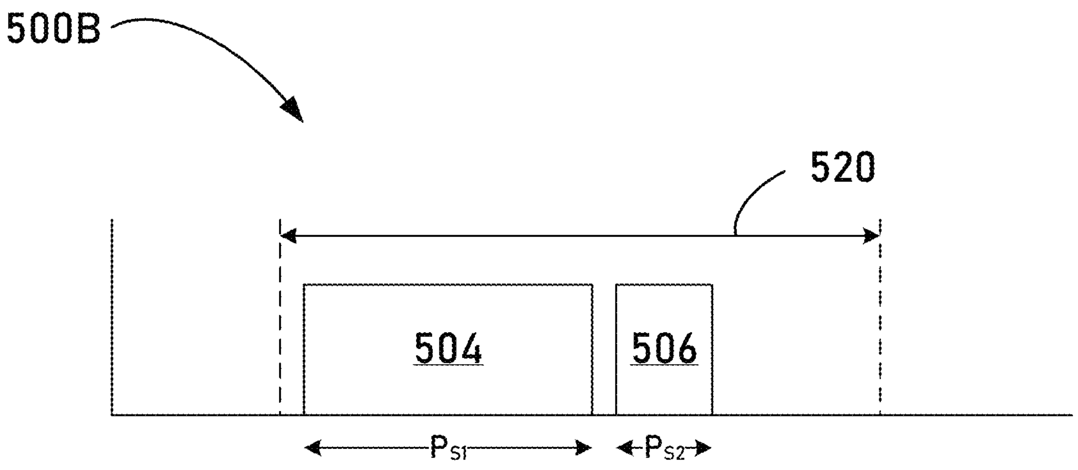

FIG. 5B illustrates a second pulse sequence 500B, consisting of a shortened pulse 504 of pulse length $P_{S1}$ and a short pulse 506 of pulse width $P_{S2}$, according to embodiments of the present disclosure. The total pulse width of the second pulse sequence 500B is $P_{S1}+P_{S2}$. For exemplary purposes in the present disclosure, $P_{S1}+P_{S2}=P_1$, thus the second pulse sequence 500B has the same total pulse width as the first pulse sequence 500A.

In some examples, $P_{S1}<P_1$, and $P_{S2}<P_{S1}$. In some examples $P_{S1}=P_{S2}$. In some examples, the shortened pulse 504 and the short pulse 506 are spaced by a gap, the shortened pulse 504 and the short pulse 506 immediately consecutive. In some examples, the second pulse sequence 500B is a pulse sequence applied by a heating element of a thermal printer to print one pixel. In some examples, the second pulse sequence 500B may be an initial pulse sequence, or an adjusted pulse sequence.

Figure 5C:
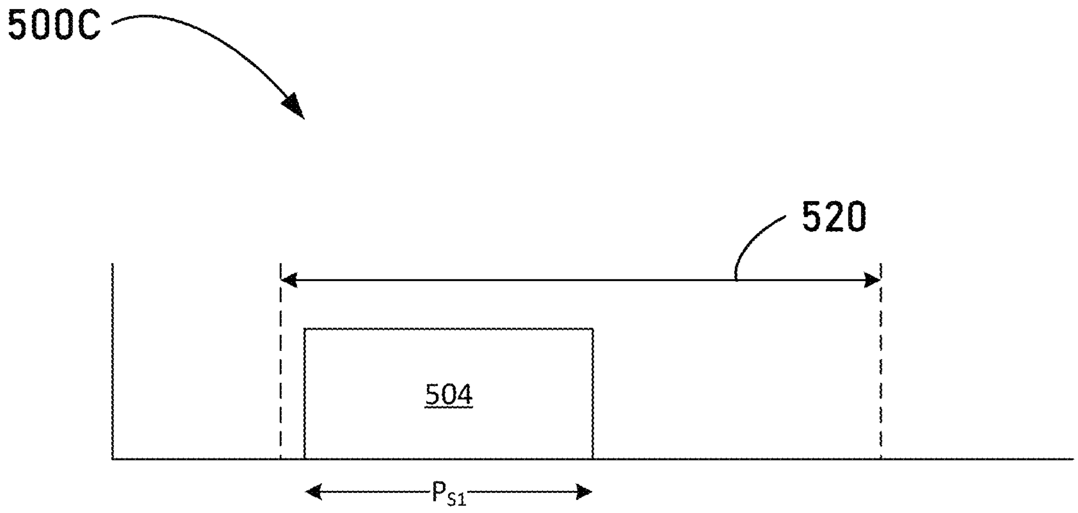

FIG. 5C illustrates a third pulse sequence 500C, consisting of one shortened pulse 504 having a pulse width $P_{S1}$, such that the total pulse width of the third pulse sequence 500C is $P_{S1}$ according to embodiments of the present disclosure. In some examples, the total pulse width of the third pulse sequence 500C is less than the total pulse width of the first pulse sequence 500A. In some examples, the third pulse sequence 500C is a pulse sequence applied by a heating element of a thermal printer to print one pixel. In some examples, the third pulse sequence 500C may be an initial pulse sequence, or an adjusted pulse sequence.

Figure 5D:
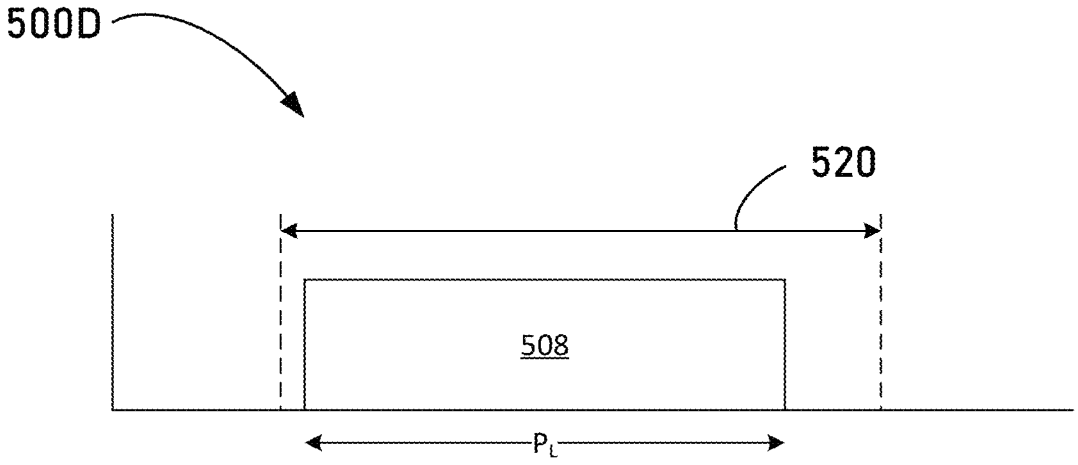

FIG. 5D illustrates a fourth pulse sequence 500D, consisting of an extended pulse 508 of pulse width $P_L$. In some examples $P_L>P_1$. In some examples, the fourth pulse sequence 500D is a pulse sequence applied by a heating element of a thermal printer to print one pixel. In some examples, the fourth pulse sequence 500D may be an initial pulse sequence, or an adjusted pulse sequence.

Figure 5E:
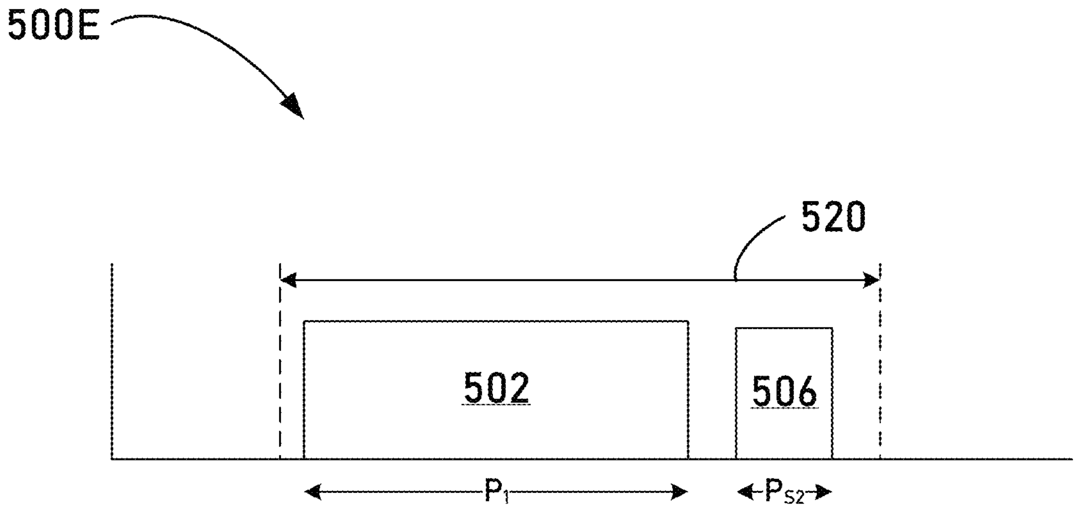
Figure 5F:
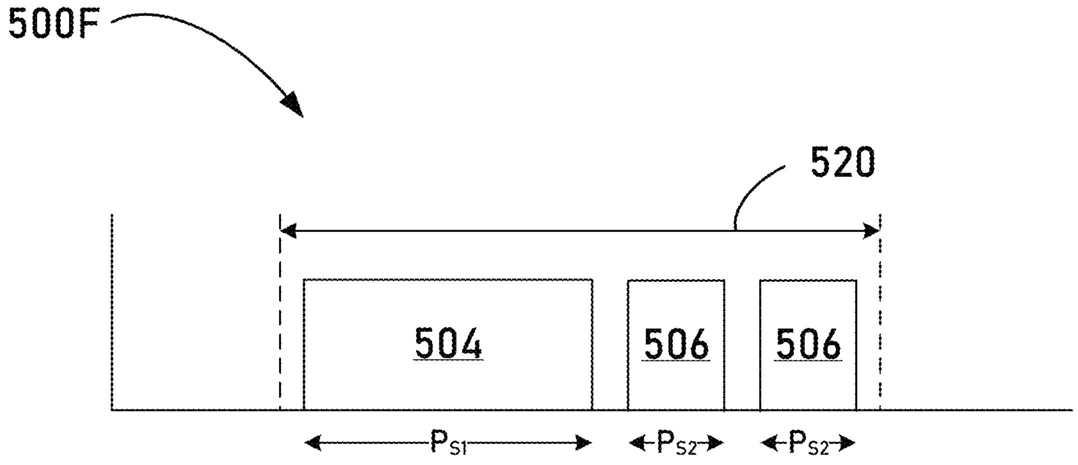

FIG. 5E illustrates a fifth pulse sequence 500E, consisting of a standard pulse 502 and a short pulse 506, according to embodiments of the present disclosure. In some examples, the standard pulse 502 and the short pulse 506 are spaced by a gap. In some examples, the standard pulse 502 and the short pulse 506 are immediately consecutive. In some examples, the fifth pulse sequence 500E is a pulse sequence applied by a heating element of a thermal printer to print one pixel. In some examples, the fifth pulse sequence 500E may be an initial pulse sequence, or an adjusted pulse sequence.

FIG. 5F illustrates a sixth pulse sequence 500F, consisting of a plurality of short pulses 506, according to embodiments of the present disclosure. As illustrated, the sixth pulse sequence includes a shortened pulse 504 and two short pulses 506. In some examples, two or more of the pulses are spaced by a gap. In some examples, two or more of the pulses are immediately consecutive. Also contemplated are examples of the sixth pulse sequence 500F having between 1 short pulse 506 and ten short pulses 506, where the upper limit of the number of short pulses 506 is governed by the pulse window 520. Said differently, the sixth pulse sequence 500F may include as many short pulses 506 as may fit within the pulse window 520. In some examples, two or more of the short pulses 506 may be immediately consecutive to one another. In some examples, two or more of the short pulses 506 may be spaced by a gap. In some examples, the total pulse width of the sixth pulse sequence 500F may be greater than the total pulse width of the first pulse sequence. In other embodiments, the total pulse width of the sixth pulse sequence 500F may be less than the total pulse width of the first pulse sequence. In some examples, the total pulse width of the sixth pulse sequence 500F may be equivalent to the total pulse width of the first pulse sequence. In some examples, the pulse widths $P_{S2}$ may vary between short pulses 506 within the sixth pulse sequence 500F. In some examples, the sixth pulse sequence 500F is a pulse sequence applied by a heating element of a thermal printer to print one pixel. In some examples, the sixth pulse sequence 500F may be an initial pulse sequence, or an adjusted pulse sequence.

Six pulse sequences 500A-F are illustrated in the Figures; however, these are merely exemplary pulse sequences demonstrating variable total pulse widths and pulse profiles.

Turning back to block 320 of FIG. 3, responsive to a window being identified as being outside of the defined range, the pulse sequence to be delivered to the heating element to print the pixel of interest 404' corresponding to the identified window is adjusted. The pulse sequence to be delivered may be changed from an initial pulse sequence having a first total pulse width to an adjusted pulse sequence having a total pulse width differing from the first total pulse width.

Generally, responsive to identifying a high-density window, the initial pulse sequence is changed to a pulse sequence having a total pulse width that is less than the pulse width of the initial pulse sequence.

As a non-limiting example, a high-density window may be identified in a print pattern. The initial pulse sequence for the printer may be the second pulse sequence 500B, having a total pulse width of $P_{S1}+P_{S2}$. The pulse sequence to be delivered to the pixel of interest 404' corresponding to the identified high-density window may be adjusted from the second pulse sequence 500B to the adjusted pulse sequence (third pulse sequence 500C, having a total pulse width of $P_{S1}$. Stated differently, the initial pulse sequence includes two pulses, and in order to shorten the total pulse width of the pulse sequence in the adjustment, one of the two pulses of the initial pulse sequence may be omitted.

As another non-limiting example, a high-density window may be identified in a print pattern. The initial pulse sequence for the printer may be the first pulse sequence 500A, having a single pulse of pulse width of $P_1$. The pulse sequence to be delivered to the pixel of interest 404' corresponding to the identified high-density window may be adjusted from the first pulse sequence 500A to the third pulse sequence 500C, having a total pulse width of $P_{S1}$. Stated differently, the initial pulse sequence includes a single pulse, and in order to shorten the pulse width of the pulse sequence in the adjustment, the single pulse is shortened.

Generally, responsive identifying a low-density window, the initial pulse sequence is changed to a pulse sequence having a total pulse width that is greater than the total pulse width of the initial pulse sequence.

As another non-limiting example, a low-density window may be identified in the print pattern. The initial pulse sequence for the printer may be the first pulse sequence having a single pulse of pulse width $P_1$. The pulse sequence to be delivered to the pixel of interest 404' corresponding to the identified low-density window may be adjusted from the initial pulse sequence (the first pulse sequence 500A) to the fifth pulse sequence 500E, having a total pulse width of $P_1+P_{S2}$. Stated differently, the initial pulse sequence includes a single pulse, and in order to lengthen the total pulse width of the pulse sequence in the adjustment, an additional pulse is added. In the same manner, the initial pulse sequence may be the second pulse sequence 500B, and a pulse is added, such that the adjusted pulse sequence is the sixth pulse sequence 500F.

As another non-limiting example, a low-density window may be identified in the print pattern. The initial pulse sequence for the printer may be the first pulse sequence having a single pulse of pulse width $P_1$. The pulse sequence to be delivered to the pixel of interest 404' corresponding to the identified low-density window may be adjusted from the initial pulse sequence (the first pulse sequence 500A) to the fourth pulse sequence 500D, having a single pulse of pulse width $P_L$. Stated differently, the initial pulse sequence includes a single pulse, and in order to lengthen the total pulse width of the pulse sequence in the adjustment, the pulse is lengthened or extended.

Generally speaking, the total pulse width of a pulse sequence may be increased by adding one or more additional pulses or extending a pulse in the pulse sequence; and the total pulse width of a pulse sequence may be decreased by omitting a pulse or shortening a pulse in the pulse sequence.

In some examples, the pulse sequence may be adjusted prior to pixels being printed on a media item. In this manner, a print pattern may be analyzed by a computing device or logic circuit and ascribe or designate pulse sequences to certain pixels in the print pattern, or certain groups of pixels in the print pattern.

In some examples, pulse sequences may be adjusted in step with a printing process. In examples where the windows are identified by a counter or filter associated with a heating element, the thermal printhead may include an additional device in communication with both the heating element and the filter or counter which is configured to adjust the pulse sequence delivered to the heating element responsive to the metric corresponding to the pulses received by the heating element is outside of the predetermined range, such as a processor, microprocessor, or microcontroller.

Block 330 of the method 300, the pixel is printed, according to embodiments of the present disclosure. When the pixel to be printed is not a pixel of interest 404' corresponding to a window that is outside of the defined range, the heating element to print the pixel may receive a initial pulse sequence to print the pixel. When the pixel to be printed is a pixel of interest 404' corresponding to a window identified as being outside of the defined range, the heating element to print the pixel receives an adjusted pulse sequence, relative to the initial pulse sequence.

The steps described by blocks 310, 320 and 330 may be performed with varying chronology, depending on the mode of application of the method. For example, when the method 300 is executed by a thermal printer employing a logic circuit or computing device to digitally analyze a print pattern, windows may be identified (e.g., block 310) prior to the thermal printhead being engaged. Similarly, pulse sequences may be adjusted (e.g., block 320) prior to the thermal printhead being engaged. In this manner, the pulse sequences to be delivered to each heating element are determined prior to the thermal printhead being engaged. Subsequently, all of the pixels (e.g., all those to be printed) of the print pattern are printed (e.g., block 330) after each pixel of the print pattern has been designated a pulse sequence (e.g., initial or adjusted). In some examples, analysis (e.g., block 310 and block 320) is performed on a line-by-line basis, and pixels are printed (e.g., block 330) after each line is analyzed.

In some examples, analysis is performed on a group of lines, or group of columns, where one pixel in the group of lines or columns is analyzed, and the pulse sequence is adjusted for each pixel in the group of lines or columns based on whether the window corresponding to the one pixel is identified as being outside of the predetermined range. In this manner a single pixel from a group of pixels may be used as a representative sample of the group of pixels.

In some applications of the method 300, a device configured to execute one or more steps of the method 300 may include various adjustable setpoints for certain parameters about which the method 300 revolves. The parameters may include the size of the windows, the upper threshold of the defined range, the lower threshold of the defined range, the initial pulse sequence, the shortened pulse sequence and the extended pulse sequence.

After block 330, the method 300 may be concluded, according to embodiments of the present disclosure. In some examples, further steps may be taken in the method 300 to further improve print quality, where the method 300 is calibrated based on received data corresponding to the printed media.

At block 340 of the method 300, data corresponding to the printed pixels is received, according to embodiments of the present disclosure. The data corresponding to the printed pixels may be observed by a user or obtained by a sensor. The data corresponding to the printed pixels preferably corresponds to a print condition which the method 300 was employed to reduce or prevent. As an example, the data corresponding to the printed pixels may reflect the darkness of certain regions of the printed pixels, or the presence of a burn on the printed media.

In some examples, the data is sensor data obtained by an optical sensor configured to detect the darkness of indicia printed on thermally printed media. In some examples, the data is sensor data obtained by a temperature sensor configured to detect the temperature of thermally printed media (e.g., to detect burning of the thermally printed media). In some examples, the data is user data input to a system by a user observing thermally printed media.

At block 350 of the method 300, the received data corresponding to the printed pixels is used to calibrate the defined range, according to embodiments of the present disclosure. When a given applicable device executes the method 300, the device may include setpoints for the various parameters of the method 300. For example, in embodiments where black pixels are counted in a window, the upper threshold of the defined range may be set at 85%, and the lower threshold set at 15%, and the window size set as 20 pixels. In some examples the initial pulse sequence may be the second pulse sequence 500B, the shortened pulse sequence (e.g., adjusted pulse sequence for exceeding the upper threshold) is the third pulse sequence 500C, and the lengthened pulse sequence (e.g., adjusted pulse sequence for not meeting the lower threshold) is the sixth pulse sequence 500F.

The received data may include measured values which may be compared with expected values to evaluate the effectiveness of the parameter setpoints. Thusly, the parameter setpoints may be adjusted corresponding to deltas between the expected values and the measured values. For example, if data reflecting over darkening is received, the upper threshold of the defined range may be lowered, or the shortened pulse sequence changed to a shorter pulse sequence. If data reflecting under-darkening of certain regions is received, the lower threshold of the defined range may be raised, or the lengthened pulse sequence may be further extended. If darkening is inconsistent across one or more regions of the printout, the window size may be reduced, such that the temperature compensation effects are applied at a higher degree of specificity.

In some examples, the upper threshold of the defined range is decreased when the sensor data indicates that the temperature of the media element exceeds a predetermined high temperature threshold.

In some examples, a lower threshold of the defined range is increased when the sensor data indicates that the temperature of the media element does not meet a predetermined low temperature threshold.

In some examples, an upper threshold of the defined range is decreased when the sensor data indicates that the media element contains a printed region which is darker than a predetermined optical threshold.

In some examples, a lower threshold of the defined range is increased when the data received from the optical sensor indicates that the media element contains a printed region which is lighter than a predetermined optical threshold.

According to some embodiments, after block 350, the method 300 may be concluded.

Figure 6:
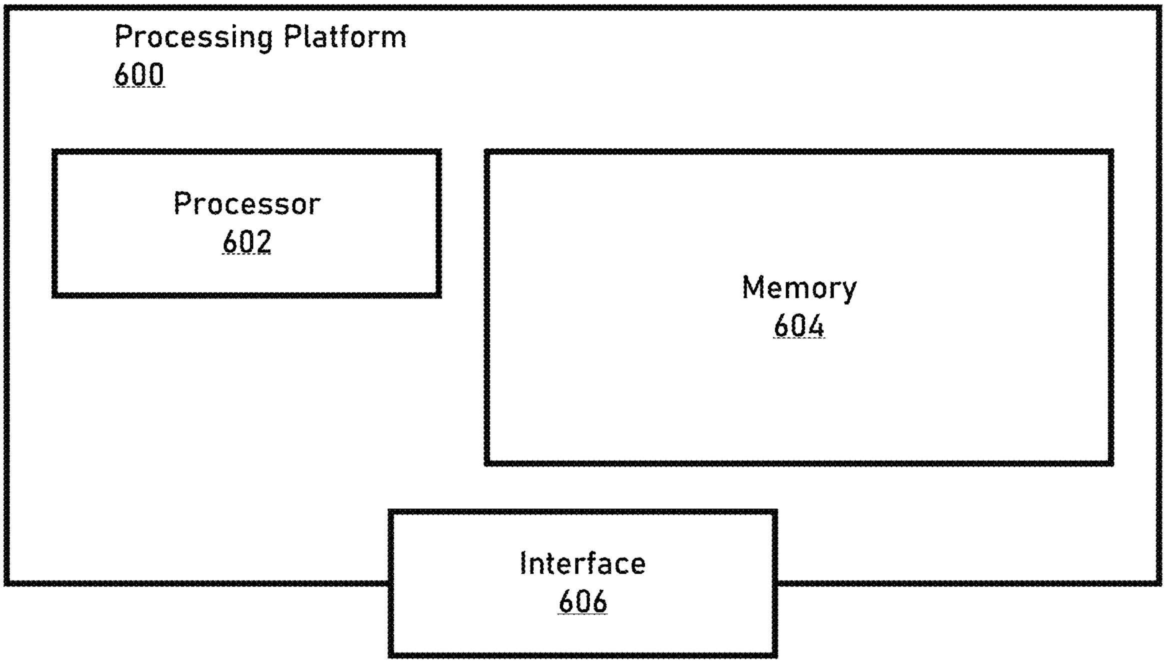
FIG. 6 illustrates a block diagram of an example device operable to perform certain steps of the method of FIG. 3, according to embodiments of the present disclosure.

FIG. 6 is a block diagram representative of an example a processing platform 600 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 600 of FIG. 6 includes a processor 602 such as, for example, one or more microprocessors, controllers, and/or any suitable type of processor. The example processing platform 600 of FIG. 6 includes memory 604 (e.g., volatile memory, non-volatile memory) accessible by the processor 602 (e.g., via a memory controller). The example processor 602 interacts with the memory 604 to obtain, for example, machine-readable instructions stored in the memory 604 corresponding to, for example, the operations represented by the flowcharts of this disclosure. Additionally, or alternatively, machine-readable instructions corresponding to the example operations described herein may be stored on one or more removable media (e.g., a compact disc, a digital versatile disc, removable flash memory, etc.) that may be coupled to the processing platform 600 to provide access to the machine-readable instructions stored thereon.

The example processing platform 600 of FIG. 6 also includes an interface 606 to enable communication with other machines via, for example, one or more networks. The example interface 606 includes any suitable type of communication interface(s) (e.g., wired and/or wireless interfaces) configured to operate in accordance with any suitable protocol(s). The network interface 606 may support connections to certain devices used to execute the method 300 of FIG. 3, including the thermal printhead 100 of FIG. 1, and a sensor 710. The interface 606 may also provide, or facilitate a connection to, a user input/output interface, which may be employed to communicate print instructions, print files, setpoint values, and other data from a user or user device to the processing platform 600.

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

Generally speaking, the processing platform 600 is an example of a computing device operable to execute the window identification and pulse sequence adjustment portions of the method 300 (e.g., block 310 and block 320). The programs stored within the memory 604 of the processing platform 600 are configured to instruct the processor 602 to perform operations in relation to a print pattern (e.g., print pattern 200, which may be represented to the processor 602 as a digital file of one of various conventional file-types) which results in the adjustment (e.g., as necessary) to certain pixels to be printed in the print pattern, corresponding to identified windows of pixels where a number of pulses of electrical current to be supplied to a heating element of the thermal printhead to print the pixels within the window is outside of a defined range.

The memory 604 may also store programs executable by the processor 602 to adjust parameter setpoints, such as window size, upper and lower thresholds of the defined range, and initial pulse sequences (see block 350 of the method 300 of FIG. 3) responsive to sensor data received from the sensor.

Figure 7A:
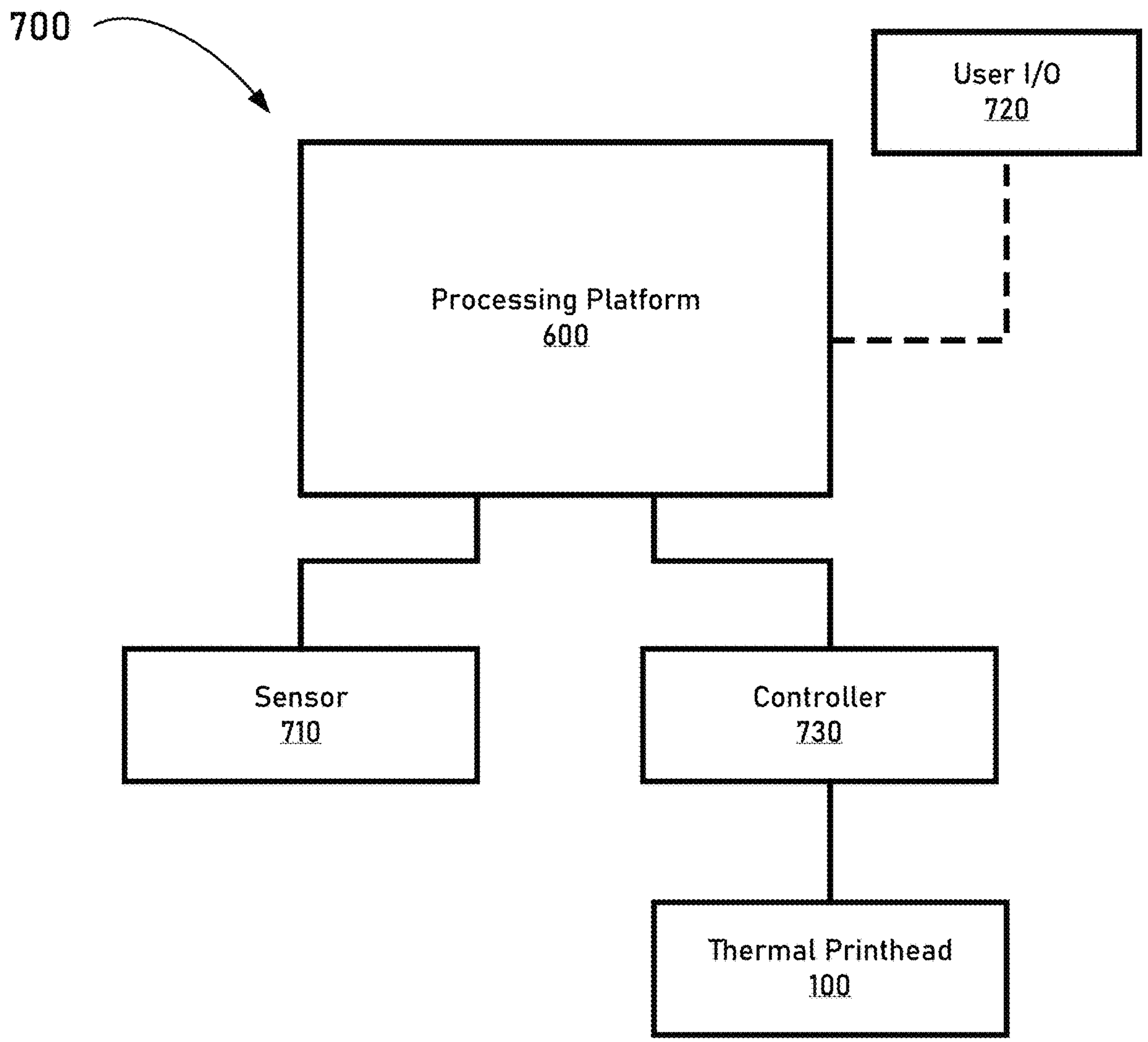
FIG. 7A illustrates a block diagram of a media processing device, according to embodiments of the present disclosure.

FIG. 7A illustrates a block diagram of a media processing device 700, (e.g., a thermal printer), according to embodiments of the present disclosure. The media processing device 700 includes a processing platform 600, which in various embodiments may be embodied by a processor, microprocessor, microcontroller, or similar device. The media processing device 700 includes a thermal printhead 100, and ins some embodiments, a sensor 710. The media processing device further includes, or includes a connection to, a user input/output interface. The media processing device further includes a controller 730, e.g. a microcontroller, or microprocessor, which is configured to deliver pulse sequences of electrical current to the various heating elements of the thermal printhead 100 to print pixels on a thermally printable medium.

In some examples, the controller 730 is integrally formed with the processing platform 600, such that the processing platform 600 is configured to deliver pulse sequences of electrical current to the various heating elements of the thermal printhead 100.

In some examples, the controller 730 is integrally formed with the thermal printhead such that the thermal printhead 100 is configured to deliver pulse sequences of electrical current to the various heating elements of the thermal printhead 100. In such embodiments the controller receives data signals transmitted from the processing platform 600 corresponding to pulse sequences to be delivered to the heating elements of the thermal printhead 100, and the controller delivers the pulse sequences according to the received data.

In some examples, the controller 730 is formed independently of, and connected to, both the processing platform 600 and the thermal printhead 100. In such embodiments the controller receives data signals transmitted from the processing platform 600 corresponding to pulse sequences to be delivered to the heating elements of the thermal printhead 100, and the controller delivers the pulse sequences according to the received data.

According to some embodiments, the media processing device 700 is configured such that one or more steps of the method 300 of FIG. 3 are executable by the media processing device 700.

Figure 7B:
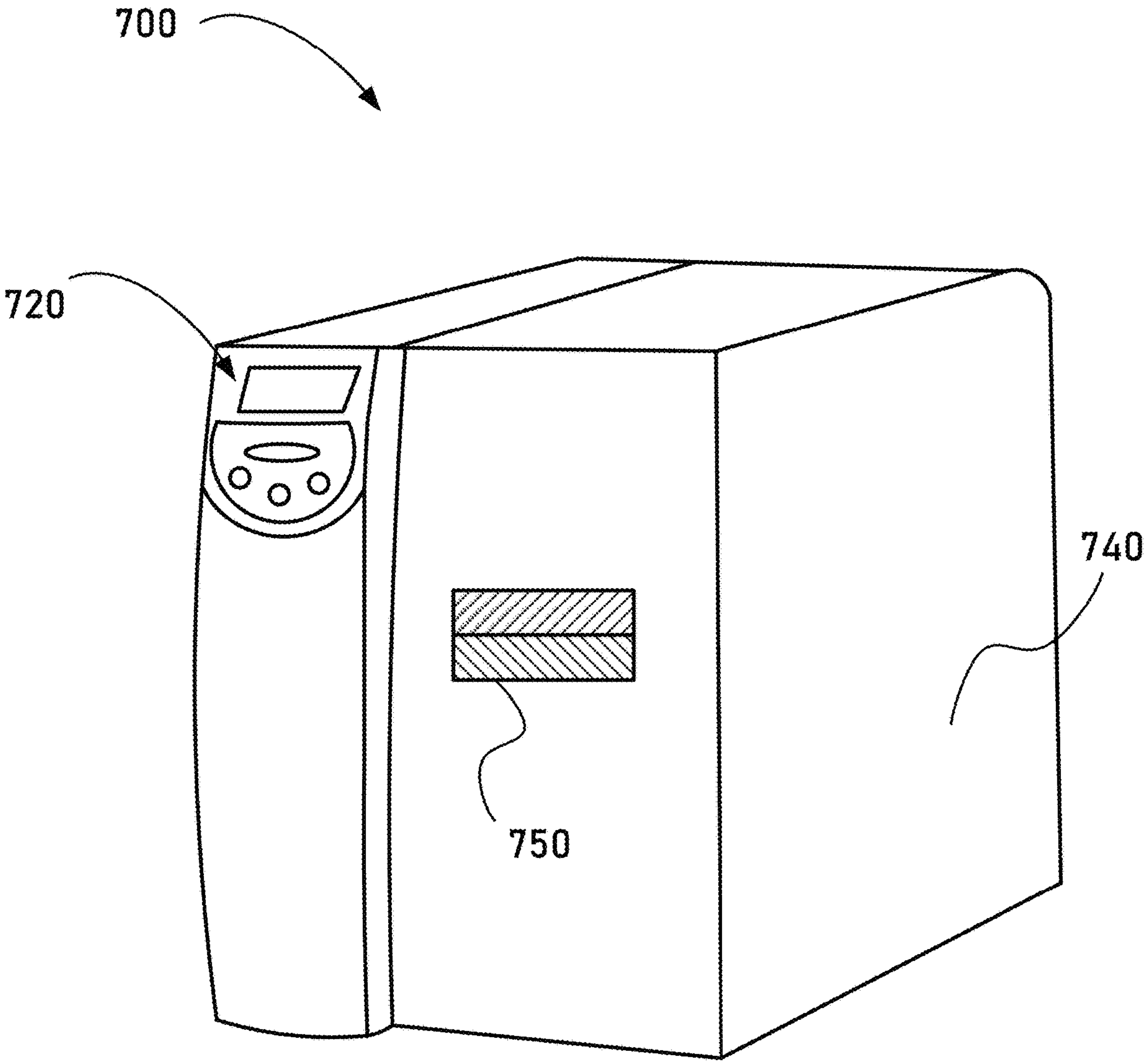
FIG. 7B illustrates the media processing device represented by the block diagram of FIG. 7A, according to embodiments of the present disclosure.

FIG. 7B illustrates the media processing device 700 represented by the block diagram of FIG. 7A, according to embodiments of the present disclosure. The media processing device 700 may include a user interface 720, which may include various combinations of buttons, displays, touch screen inputs, and other conventional structures across various embodiments. The media processing device 700 also includes a housing 740, in which the thermal printhead 100 and processing platform 600 are housed. A media outlet 750 may be defined in the housing 740 where processed media may be dispensed from the media processing device 700. In some embodiments, the media processing device further includes conventional mechanisms, such as a platen roller, various drivers, a media supply apparatus, various sensors (e.g., sensor 710) and other associated circuity. In some examples, the processing platform is configured to control the thermal printhead 100, as well as any drivers and platen rollers which may be included in the media processing device 700.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described.

However, one of ordinary skill in the art appreciates that various modifications and changes can be made without departing from the scope of the present technology as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed present technology is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of temperature compensation for a thermal printhead having a plurality of heating elements, wherein the thermal printhead is configured to print pixels of a print pattern, the print pattern including a plurality of columns and a plurality of lines, each heating element corresponding to one column of the print pattern, where for each pixel to be printed, the thermal printhead delivers a pulse sequence of at least one pulse of electrical current to a heating element corresponding to a column of the pixel, causing the heating element to print the pixel, the method comprising:

prior to printing the pixel, identifying, for the heating element corresponding to the column of the pixel, when a number of pulses delivered to the heating element in a predetermined window prior to a line of the pixel is outside of a defined range; and responsive to determining that the number of pulses is outside the defined range, and prior to printing the pixel, adjusting the pulse sequence to be delivered to the heating element corresponding to the column of the pixel to print the pixel at a line of the pixel following the predetermined window.

2. The method of claim 1, wherein the pulse sequence is adjusted by decreasing a pulse width of a pulse in the pulse sequence responsive to the number of pulses in the window for the heating element exceeding an upper threshold of the defined range.

3. The method of claim 1, wherein the pulse sequence is adjusted by increasing a pulse width of a pulse in the pulse sequence responsive to the number of pulses in the window for the heating element being below a lower threshold of the defined range.

4. The method of claim 1, wherein the pulse sequence includes at least two pulses, and the pulse sequence is adjusted by omitting at least one pulse from the pulse sequence responsive to the number of pulses in the window for the heating element exceeding an upper threshold of the defined range.

5. The method of claim 1, wherein the pulse sequence is adjusted by adding at least one pulse to the pulse sequence responsive to the number of pulses in the window for the heating element being below a lower threshold of the defined range.

6. The method of claim 1, wherein a size of the predetermined window is determined based on a number of lines in the print pattern preceding the line of the pixel.

7. The method of claim 1, wherein a size of the predetermined window is determined based on a period of time prior to printing the pixel.

8. The method of claim 1, further comprising:

receiving sensor data from a sensor measuring a condition of a printed media element on which the pixel is printed; and calibrating the defined range based on the sensor data.

9. The method of claim 8, wherein the sensor is a temperature sensor, and an upper threshold of the defined range is decreased when the sensor data indicates that the temperature of the media element exceeds a predetermined high temperature threshold.

10. The method of claim 8, wherein the sensor is a temperature sensor, and a lower threshold of the defined range is increased when the sensor data indicates that the temperature of the media element does not meet a predetermined low temperature threshold.

11. The method of claim 8, wherein the sensor is an optical sensor, and an upper threshold of the defined range is decreased when the sensor data indicates that the media element contains a printed region which is darker than a predetermined optical threshold.

12. The method of claim 8, wherein the sensor is an optical sensor, and a lower threshold of the defined range is increased when the data received from the optical sensor indicates that the media element contains a printed region which is lighter than a predetermined optical threshold.

13. The method of claim 1, wherein the window is identified by a counter or a filter operating during a thermal printing process.

14. A device, comprising:

a processing platform;

a thermal printhead, including a plurality of heating elements, each configured to print a column of pixels on a media of a print pattern;

wherein the print pattern includes a plurality of columns and a plurality of lines, each heating element corresponding to one column of the print pattern:

wherein for each pixel to be printed, the device is configured to deliver a pulse sequence of at least one pulse of electrical current to a heating element corresponding to a column of the pixel, causing the corresponding heating element to print the pixel on a media element;

wherein, prior to printing a given pixel, the device is configured to identify, for the heating element corresponding to the column of the given pixel, when a number of pulses to be delivered to the heating element in a predetermined window prior to the line of the given pixel is outside of a defined range, and responsive to identifying the number of pulses delivered to the heating element in the predetermined window is outside of the defined range, to adjust the pulse sequence to be delivered to the heating element to print the given pixel.

15. The device of claim 14, wherein the pulse sequence is adjusted by decreasing a pulse width of a pulse in the pulse sequence responsive to the number of pulses in the window for the heating element exceeding an upper threshold of the defined range.

16. The device of claim 14, wherein the pulse sequence is adjusted by increasing a pulse width of a pulse in the pulse sequence responsive to the number of pulses in the window for the heating element being below a lower threshold of the defined range.

17. The device of claim 14, wherein the pulse sequence includes at least two pulses, and the pulse sequence is adjusted by omitting at least one pulse from the pulse sequence responsive to the number of pulses in the window for the heating element exceeding an upper threshold of the defined range.

18. The device of claim 14, wherein the pulse sequence is adjusted by adding one or more pulses to the pulse sequence responsive to the number of pulses in the window for the heating element being below a lower threshold of the defined range.

19. The device of claim 14, wherein the processing platform is configured to analyze the print pattern to identify when the number of pulses delivered to the heating element in the predetermined window prior to the line of the given pixel is outside of the defined range, adjust the pulse sequence, transmit data corresponding to the pulse sequence to a controller in communication with the thermal printhead, the controller configured to deliver the pulse sequence to the corresponding heating element according to the data transmitted from the processing platform.

20. The device of claim 14, wherein the processing platform is configured to analyze the print pattern to identify when the number of pulses delivered to the heating element in the predetermined window prior to the line of the given pixel is outside of the defined range, adjust the pulse sequence, and deliver the pulse sequence to the corresponding heating element.

21. The device of claim 14, further comprising a platen roller, wherein the platen roller and the thermal printhead are controlled by the processing platform.

* * * * *